United States Patent [19]

Arnold

[11] 4,002,679

[45] Jan. 11, 1977

[54] PREPARATION OF POLYBENZIMIDAZOLES

[75] Inventor: Fred E. Arnold, Centerville, Ohio

[73] Assignee: The United States of America as represented by the Secretary of the Air Force, Washington, D.C.

[22] Filed: Mar. 27, 1975

[21] Appl. No.: 563,007

Related U.S. Application Data

[62] Division of Ser. No. 495,452, Aug. 7, 1974, Pat. No. 3,901,855.

[52] U.S. Cl. .................. 260/556 A; 260/294.8 C; 260/294.8 F; 260/556 S
[51] Int. Cl.$^2$ ............. C07C 143/75; C07C 143/77; C07C 143/79
[58] Field of Search ...... 260/556 A, 556 AR, 556 S

[56] References Cited

UNITED STATES PATENTS

| | | | |
|---|---|---|---|
| 3,546,181 | 12/1970 | Arnold | 260/78 TF |
| 3,632,414 | 1/1972 | Arnold et al. | 427/430 X |
| 3,702,326 | 11/1972 | Arnold | 260/78 TF X |
| 3,740,374 | 6/1973 | Arnold et al. | 260/47 CP |
| 3,784,517 | 1/1974 | Hedberg et al. | 260/30.8 R X |

*Primary Examiner*—Daniel E. Wyman
*Assistant Examiner*—Thomas A. Waltz
*Attorney, Agent, or Firm*—Joseph E. Rusz; Cedric H. Kuhn

[57] ABSTRACT

A process for preparing polybenzimidazoles is disclosed in which aromatic bis-orthoaminosulfonamides and aromatic dicarboxylic acids or derivatives thereof are polymerized in polyphosphoric acid. The process provides thermally stable heterocyclic polymers of very high molecular weight that are especially useful in forming films and fibers.

3 Claims, No Drawings

PREPARATION OF POLYBENZIMIDAZOLES

RIGHTS OF THE GOVERNMENT

The invention described herein may be manufactured and used by or for the Government of the United States for all governmental purposes without the payment of any royalty.

This application is a division of copending application Ser. No. 495,452, filed on Aug. 7, 1974, now issued as U.S. Pat. No. 3,901,855.

FIELD OF THE INVENTION

This invention relates to a process for preparing high molecular weight polybenzimidazoles. In one aspect the invention relates to a new monomer for use in preparing the polymers.

BACKGROUND OF THE INVENTION

The conventional process for preparing polybenzimidazoles is disclosed by C. S. Marvel et al in U.S. Pat. No. 3,174,974. As described in this patent, the process involves a two-stage procedure. In the first stage, the reactants are melt polymerized until a polymer of intermediate molecular weight is obtained. Thereafter, in the second stage of the process, the melt formed polymer is pulverized and subjected to solid state polymerization to produce a higher molecular weight. While this two-step process is the common commercial method for producing polybenzimidazoles, several difficulties are encountered in carrying out the method. The very nature of the two stages of the method, i.e., the melt polymerization step and the solid state powder polymerization step, makes temperature control an important factor. And it is difficult, if not impossible, to control the temperature so as to avoid crosslinking of the polymer. The process for preparing polybenzimidazoles is conducted in an inert atmosphere. During grinding of the prepolymer from the first step, air is absorbed on the surface of the prepolymer. The difficulty in effecting complete removal of this absorbed air before heating poses another disadvantage in the prior art process.

In U.S. Pat. No. 3,784,517, F. L. Hedberg et al disclose a process for preparing polybenzimidazoles that overcomes disadvantages of the above-described process. Thus, Hedberg et al describe a one-step process in which temperature control is unnecessary that comprises carrying out the polymerization in a reaction medium consisting essentially of an aromatic or aliphatic sulfone.

Both of the above-described processes utilize as a monomer fused tetraamines, such as 1,2,4,5-tetraaminobenzene tetrahydrochloride, which exist in various hydrated forms and cannot be recrystallized to a high degree of purity. The free amine which is unstable to both air and light cannot withstand degradation so that the molecular weight of the products is limited.

It is an object of the present invention, therefore, to provide a process for preparing high molecular weight polybenzimidazoles.

Another object of the invention is to provide high purity bis-orthoaminosulfonamide monomers for use in the preparation of polybenzimidazoles.

Other objects and advantages of the invention will become apparent to those skilled in the art upon consideration of the accompanying disclosure.

SUMMARY OF THE INVENTION

The present invention resides in a process for preparing polybenzimidazoles which comprises polymerizing in an inert atmosphere a bis-orthoaminosulfonamide and an aromatic dicarboxylic acid or derivative thereof, the polymerizing being conducted in polyphosphoric acid. The polymerization reaction involved is shown by the following equation:

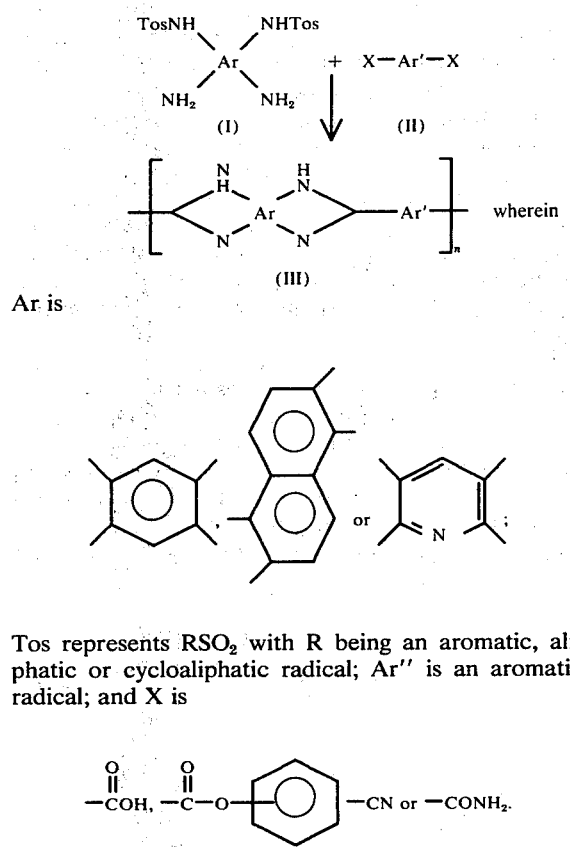

wherein Ar is

Tos represents $RSO_2$ with R being an aromatic, aliphatic or cycloaliphatic radical; Ar'' is an aromatic radical; and X is $-COH$, $-C-O-$⟨⟩ $-CN$ or $-CONH_2$.
    ‖        ‖
    O        O The number ($n$) of the repeating units (III) is generally such that the polybenzimidazole has an intrinsic viscosity of 0.5 to 5 dl/g in 100 percent methanesulfonic acid.

The improvement obtained in preparing polybenzimidazoles by the present process lies, at least in part, in the discovery that the bis-orthoaminosulfonamides (compounds of formula I) can be purified by recrystallization to a very high degree, e.g., to within a half degree melting point. Furthermore, in contrast to conventionally employed tetraamines which are subject to degradation, it has been found that the monomers of this invention can be stored for extended periods of time without light and air oxidation. The stability of the monomers results from the fact that the oxygen of the sulfonamide group hydrogen bonds with the orthoamino protons which acts as an internal stabilizer. Still further, the sulfonamide groups are quantitatively hydrolyzed to the free amine in the polymerization medium so that stoichiometry of the monomers in the process is not affected. Because of these several factors, use of the bis-orthoaminosulfonamides as monomers in the preparation of polybenzimidazoles makes it possible to prepare very high molecular weight polymers. For example, the use of 1,3-diamino-4,6-(p-toluenesulfamido)benzene as a monomer replacement for 1,2,4,5-tetraamonobenzene in the polymerization provides a polybenzimidazole having a molecular weight about six times greater than that reported in the literature [H. Vogel and C. S. Marvel, J. Polymer Sci., 50, 511(1961)].

In formula (I) representing the bis-orthoaminosulfonamides, "Tos", an abbreviation for the expression "tosylate", includes those sulfonamide derivatives represented by —RSO₂ in which R is an aromatic, aliphatic or cycloaliphatic radical. The aromatic, aliphatic and cycloaliphatic nuclei can have various hydrocarbon radicals substituted thereon, and the aromatic nuclei can also have halogen atoms, e.g., chlorine, bromine, iodine and fluorine, substituted thereon. Advantageously the hydrocarbon portion has no more than 20 carbon atoms therein since larger groups, while still reactive, have a tendency to react sluggishly.

Typical sulfonamide derivative groups are those in which R is phenyl, tolyl, xylyl, naphthyl, diphenyl, methylnaphthyl, benzyl, chlorophenyl, chlorodiphenyl, methyl, ethyl, propyl, amyl, octyl, decyl, dodecyl, octadecyl, cyclohexyl, cycloheptyl, methylcyclohexyl, ethylcycloheptyl, and the like.

The bis-orthoaminosulfonamides, which are new compounds, are generally synthesized by a two-stage procedure. In the first stage, bis-orthonitrosulfonamides are formed by nitration of bis-sulfonamides while in the second stage the bis-orthoaminosulfonamides are produced by reduction of the first stage product. The reactions involved can be represented by the following equation in which Ar and Tos are as indicated hereinbefore:

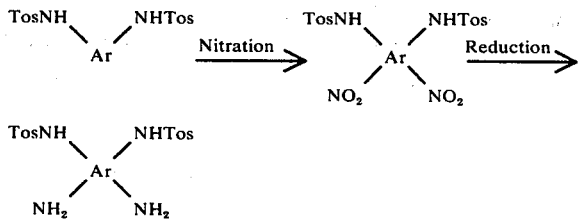

The nitration is carried out by adding nitric acid to acetic anhydride at a rate such as to maintain a temperature below about 5° C. Upon completion of the addition, a bis-sulfonamide is added. The resulting reaction mixture is stirred at about room temperature for a period of about 8 to 16 hours. The precipitate that forms is recovered, e.g., by filtration, washed with water, and recrystallized from acetone to yield a purified bis-orthonitrosulfonamide. In the reduction reaction, the bis-orthonitrosulfonamide, a reaction medium, such as N,N-dimethylacetamide, and a catalytic amount of a supported palladium catalyst are introduced into a pressure vessel. The vessel is then pressured with hydrogen for a period of about 8 to 16 hours. At the end of this period, the reaction mixture is filtered through a filter aid into a non-solvent for the product, such as diethyl ether. The precipitate that forms is recovered, e.g., by filtration, and air dried. Recrystallization from an alcohol, such as methanol, yields a high purity bis-orthoaminosulfonamide.

In the preparation of bis-orthoaminosulfonamides in which R is pyridine, it is preferred to use a one-step procedure. This is possible because the selective reactivity of the 3,5-positions of tetraaminopyridine trihydrochloride allows the formation of the bis-orthoaminosulfonamide directly by reaction with two moles of a sulfonyl chloride. In this process a sulfonyl chloride and 2,3,5,6-tetraaminopyridine trihydrochloride in a 2 to 1 mole ratio are added to a cooled reaction medium, such as pyridine. The reaction mixture is then stirred at room temperature for about 4 to 8 hours. Thereafter, the reaction mixture is poured into distilled water, thereby forming a precipitate. After separation of the precipitate, e.g., by filtration, it is recrystallized from an alcohol, such as ethanol, thereby giving a high purity bis-orthoaminosulfonamide. Examples of sulfonyl chlorides that can be used include toluene sulfonyl chloride, benzene sulfonyl chloride, xylyl sulfonyl chloride, naphthyl sulfonyl chloride, methyl sulfonyl chloride, ethyl sulfonyl chloride, propyl sulfonyl chloride, cyclohexyl sulfonyl chloride, and the like.

As mentioned above, the aromatic dicarboxylic acids or derivatives thereof, which are used as comonomers, can be represented by the formula X-Ar'-X. Examples of suitable aromatic moieties (Ar') include 1,4-phenylene; 1,3-phenylene; 1,4-haphthalene; 1,6-naphthalene; 2,6-naphthalene; 2,5-pyridine; 2,5-pyrazine; 2,5-furan, and the like. Furthermore, aromatic moieties can be employed in which the two "X" groups are on separate nuclei, the nuclei being joined by a carbon-to-carbon bond, a methylene group, an ether group or similar linking group. Examples of these latter aromatic moieties include 4,4'-diphenyl; 4,4'-diphenylether; 4,4'-diphenylsulfide; 4,4'-diphenylsulfone; 4,4'-diphenylmethane, and the like.

The compounds described in the preceding paragraph are well known compositions which are disclosed in the literature. Specific examples of such compounds include terephthalic acid, isophthalic acid, naphthalene-1,4-dicarboxylic acid, naphthalene-1,6-dicarboxylic acid, naphthalene-2,6-dicarboxylic acid, pyrazine-2,5-dicarboxylic acid, furan-2,5-dicarboxylic acid, quinoline-2,6-dicarboxylic acid, 4,4'-biphenyldicarboxylic acid, diphenylether-4,4'-dicarboxylic acid, diphenylsulfide-4,4'-dicarboxylic acid, diphenylmethane-4,4'-dicarboxylic acid, diphenylsulfone-4,4'-dicarboxylic acid, diphenylterephthalate, diphenylisophthalate, terephthalamide, isophthalamide, terephthalnitrile, isophthalnitrile, and the like.

In carrying out the process of this invention equimolar amounts of monomers (I) and (II) are reacted in polyphosphoric acid in an inert atmosphere. Examples of suitable inert gases include nitrogen, helium and argon. Initially, the reaction mixture is heated to and maintained at a temperature in the range of about 50° to 90° C for a period of about 2 to 24 hours. During this period detosylation of the bis-orthoaminosulfonamide occurs. Thereafter, the reaction mixture is heated to and maintained at a temperature ranging from about 170° to 195° C for a period of about 6 to 24 hours. During this period polymerization is occurring to provide a high molecular weight polymer. At the end of the period, the polymer is recovered from solution by pouring the reaction mixture into a non-solvent for the polymer, such as distilled water or an alcohol. The polybenzimidazole product recovered has a very high molecular weight as indicated by its intrinsic viscosity. In order to purify the polymer, it is usually desirable to wash the product with an alcohol after which it is dried at an elevated temperature under reduced pressure. The dried polymer is then precipitated from a solvent, such as methane-sulfonic acid, and again dried to provide a purified product.

A more complete understanding of the invention can be obtained by referring to the following illustrative examples which are not intended, however, to be unduly limitative of the invention.

EXAMPLE I a. 1,3-Dinitro-4,6-(p-toluenesulfamido)benzene

To 100 ml of acetic anhydride was added dropwise 15 ml of 70° nitric acid at a rate such as to maintain the temperature below 5° C. After the addition was completed, 17 g (0.0445 mole) of 1,3-(p-toluenesulfamido)benzene was added at a rate such as to maintain the temperature below 15° C. The solution was stirred at room temperature for 12 hours. The yellow precipitate that formed was collected, washed with water, and recrystallized from acetone to yield 18 g (80%) of the product, m.p. 213°–215° C.

Analysis: Calc'd for $C_{20}H_{18}N_4S_2O_8$(Wt %): C,47.42; H,3.58; N,11.05. Found (Wt %): C,47.46; H,3.37; N,10.80.

b. 1,3-Diamino-4,6-(p-toluenesulfamido)benzene

A "Parr" hydrogen pressure bomb was charged with 10 g (0.0197 mole) of 1,3-dinitro-4,6-(p-toluenesulfamido)benzene, 150 ml of N,N-dimethylacetamide and 1 g of catalyst (10% palladium on powdered charcoal). The bomb was pressurized with hydrogen to 50 psi and allowed to shake for 12 hours. The reaction mixture was suction filtered through Celite filter aid into 1 liter of stirred diethyl ether. The resulting white precipitate was collected and air dried. Recrystallization from anhydrous methanol gave 7 g (80% yield) of product, m.p. 221°–221.5° C.

Analysis: Calc'd for $C_{20}H_{22}N_4S_2O_4$: C,53.79; H,4.96; N,12.54. Found: C,53.68; H,4.95; N,12.29.

EXAMPLE II

Poly[(1,7-dihydrobenzo[1,2-d:4,5-d']diimidazole-2,6-diyl)-1,4-phenylene]

To 100 g of deoxygenated polyphosphoric acid were added 1.15 g (0.00256 mole) of 1,3-diamino-4,6-(p-toluenesulfamido)benzene and 0.4279 g (0.00256 mole) of terephthalic acid. The mixture was slowly heated (4°/min) to 90° C and maintained at that temperature for 16 hours. The temperature was then increased at the same rate to 190° C and maintained at that temperature for 6 hours. The resulting viscous solution was poured out of the flask at 190° C into a beaker and allowed to cool to room temperature. The polymer was precipitated in methanol, using a blender to facilitate mixing. The fibrous yellow material was washed twice with 1-liter portions of anhydrous methanol and dried at 200° C under reduced pressure (0.4 mm Hg). Precipitation from 500 g of methanesulfonic acid and drying in the above manner gave 0.8 g (93%) of polymer. An intrinsic viscosity of 4.9 dl/g in 100% methanesulfonic acid was determined.

Analysis: Calc'd for $(C_{14}H_8N_4)_n$: C,72.41; H,3.45; H,24.14. Found: C,72.23; H,3.56; N,23.48.

EXAMPLE III a. 2,6-Dinitro-1,5-(p-toluenesulfamido)naphthalene

To 100 ml of acetic anhydride was added 15 ml of 70% nitric acid at a rate sufficient to maintain the temperature below −10° C. After the addition was completed, 10 g (0.021 mole) of 1,5-(p- toluenesulfamido)- naphthalene was added at a rate sufficient to maintain the temperature below 0° C. The solution was stirred at room temperature for 12 hours. The yellow precipitate that formed was collected, washed with water, and recrystallized from methylene chloride to yield 4.0 g (35%) of the product, m.p. 235°–236° C.

Analysis: Calc'd for $C_{24}H_{20}N_4S_2O_8$: C,51.78; H,3.62; N,10.06. Found: C,51.55; H,3.67; N,10.10.

b. 2,6-Diamino-1,5-(p-toluenesulfamido)naphthalene

A "Parr" hydrogen pressure bomb was charged with 5 g (0.0089 mole) of 2,6-dinitro-1,5-(p-toluenesulfamido)naphthalene, 100 ml of N,N-dimethylacetamide and 0.5 g of catalyst (10% palladium on powdered charcoal). The bomb was pressurized to 50 psi with hydrogen and allowed to shake for 12 hours. The reaction mixture was suction filtered through Celite filter aid into 2 liters of stirred diethyl ether. The resulting white precipitate was collected and air dried. Recrystallization from N,N-dimethylacetamide gave 3.75 g (85%) of the product, m.p. 261°–261.5° C.

Analysis: Calc'd for $C_{24}H_{24}N_4S_2O_4$: C,58.04; H,4.87; N,11.28. Found: C,57.49; H,4.96; N,11.10.

EXAMPLE IV

Poly[1,4-dihydronaphtho[1,2-d:4,5-d']dimidazole-2,7-diyl)-1,4- phenylene]

To 100 g of deoxygenated polyphosphoric acid was added 1 g (2.0 mmoles) of 2,6-diamino-1,5-(p-toluenesulfamido)naphthalene and 0.348 g (2.1 mmoles) of terephthalic acid. The mixture was slowly heated (4°/min) to 90° C and maintained at that temperature for 12 hours. The temperature was then increased at the same rate to 190° C and maintained at that temperature for 12 hours. The resulting solution was allowed to cool to room temperature and precipitated in methanol, using a blender to facilitate mixing. The fibrous yellow material was washed twice with 1-liter portions of anhydrous methanol and dried at 200° C under reduced pressure (0.4 mm Hg). Precipitation from 200 g of methanesulfonic acid and drying in the above manner gave 0.59 g (99%) of polymer. An intrinsic viscosity of 2.2 dl/g in 100% methanesulfonic acid was determined.

Analysis: Calc'd for $(C_{18}H_{10}N_4)_n$: C,76.58; H,3.57; N,19.84. Found: C,75.43; H,4.00; N,18.98.

EXAMPLE V

2,6-Diamino-3,5-(p-toluenesulfamido)pyridine

To 100 ml of pyridine containing 7.24 g (0.038 moles) of p-toluenesulfonyl chloride, was added, as a powder, 5 g (0.019 mmole) of 2,3,5,6-tetraaminopyridine trihydrochloride monohydrate. The tetraamine was added to a cooled (−5° C) reaction medium. After the addition the reaction mixture was stirred at room temperature for 6 hours and then poured into 1 liter of distilled water. The white precipitate that formed was collected and recrystallized from 95% ethanol to afford 7.5 g (88%) of product, m.p. 242°–242.5° C.

Analysis: Calc'd for $C_{19}H_{21}N_5S_2O_4$: C,50.98; H,4.73; N,15.65. Found: C,50.93; H,4.84; N,15.60.

EXAMPLE VI

Poly[1,7-dihydropyrido[1,2-d:4,5-d']diimidazo-2,6-diyl)-1,4-phenylene]

To 100 g of deoxygenated polyphosphoric acid were added 2 g (4.4 mmoles) of 2,6-diamino-3,5-(p-toluenesulfamido)pyridine and 0.742 g (4.4 mmoles) of terephthalic acid. The mixture was slowly heated (4°/min) to 50° C and maintained at that temperature for 8 hours. The temperature was then increased at the same rate to 190° C and maintained at that temperature for 6 hours. The resulting solution was allowed to cool to room temperature and precipitated into 2 liters of anhydrous methanol. The yellow material was dissolved in 500 g of methanesulfonic acid and reprecipitated in the above manner to give 1 g (98%) of polymer. An intrinsic viscosity of 0.75 dl/g in 100% methanesulfonic acid was determined.

Analysis: Calc'd for $(C_{13}H_7N_5)_n$: C,66.94; H,3.02; N,30.03. Found: C,64.85; H,4.01; N,29.72.

As seen from the foregoing, the present process makes it possible to produce high molecular weight polybenzimidazoles. As previously mentioned, this improvement is attributable to the high purity bis-orthoaminosulfonamides that are employed as monomers in the process.

As will be evident to those skilled in the art, modifications of the present invention can be made in view of the foregoing disclosure without departing from the spirit and scope of the invention.

I claim:

1. As a new composition of matter, a compound selected from the group of compounds having the following formulas:

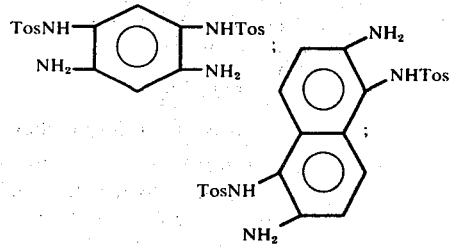

where Tos represents $RSO_2$, with R being phenyl, tolyl, xylyl, naphthyl, diphenyl, methylnaphthyl, benzyl, chlorophenyl, chlorodiphenyl, methyl, ethyl, propyl, amyl, octyl, decyl, dodecyl, octadecyl, cyclohexyl, cycloheptyl, methylcyclohexyl, or ethylcycloheptyl.

2. The composition according to claim 1 wherein the compound has the following formula:

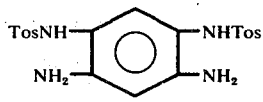

in which Tos is p-toluenesulfamido.

3. The composition according to claim 1 wherein the compound has the following formula:

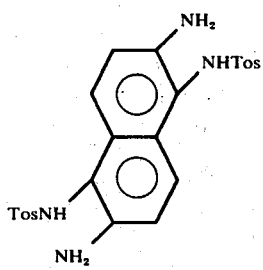

in which Tos is p-toluenesulfamido.

* * * * *